(12) United States Patent
Bartlett

(10) Patent No.: US 6,371,227 B2
(45) Date of Patent: *Apr. 16, 2002

(54) AXLE PRESSURE CONTROL SYSTEM

(75) Inventor: William P. Bartlett, Dodge Center, MN (US)

(73) Assignee: McNeilus Truck and Manufacturing, Inc., Dodge Center, MN (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/405,900

(22) Filed: Sep. 24, 1999

(51) Int. Cl.[7] ............................................... B62D 61/12
(52) U.S. Cl. ..................................... 180/24.02; 180/209
(58) Field of Search ............................... 180/21, 24.02, 180/209; 280/6.157, 6.159, 86.5

(56) References Cited

U.S. PATENT DOCUMENTS

| | | | |
|---|---|---|---|
| 3,053,335 A | * 9/1962 | Gnade et al. | 180/24.02 |
| 3,094,341 A | * 6/1963 | Alfieri | 180/24.02 |
| 3,499,663 A | * 3/1970 | Hedlund et al. | 180/24.02 |
| 3,960,389 A | 6/1976 | Narahari | |
| 4,195,856 A | 4/1980 | Larson et al. | |
| 4,684,142 A | * 8/1987 | Christenson | 180/24.02 |
| 4,705,133 A | 11/1987 | Christenson et al. | |
| 5,025,877 A | * 6/1991 | Assh | 180/24.02 |
| 5,090,495 A | 2/1992 | Christenson | |
| 5,193,063 A | * 3/1993 | Assh | 180/209 |
| 5,443,283 A | * 8/1995 | Hawkins et al. | 280/DIG. 1 |
| 5,498,021 A | 3/1996 | Christenson | |
| 5,549,322 A | 8/1996 | Hauri | |
| 5,597,174 A | 1/1997 | Christenson et al. | |
| 5,630,625 A | * 5/1997 | Shaw | 180/209 |
| 5,713,424 A | 2/1998 | Christenson | |
| 5,986,220 A | * 11/1999 | Nakazaki | 180/24.02 |
| 6,152,457 A | * 11/2000 | Silbernagel | 280/6.159 |
| 6,196,555 B1 | * 3/2001 | Gaibler | 280/6.157 |
| 6,213,237 B1 | * 4/2001 | Willman | 180/209 |

FOREIGN PATENT DOCUMENTS

| | | | | |
|---|---|---|---|---|
| CH | 556760 | * | 12/1974 | 180/24.02 |
| JP | 30608 | * | 2/1982 | 180/209 |
| SE | 111646 | * | 8/1944 | 180/24.02 |

* cited by examiner

Primary Examiner—Frank Vanaman
(74) Attorney, Agent, or Firm—Nikolai & Mersereau, P.A.

(57) ABSTRACT

An automated auxiliary axle deployment control system for a load-hauling vehicle having a time-variable payload and one or more fluid-operated auxiliary support axles comprising one or more load sensing devices for determining the payload distribution of the vehicle in real-time. One or more automatically operable pressure modulation valves adjusts the pressure applied to the one or more auxiliary axles to adjust the load carrying capacity thereof based on payload distribution. A signal processing system receives input signals from the one or more load sensing devices and produces output control signals for operating the pressure modulation valve(s).

18 Claims, 7 Drawing Sheets

AXLE PRESSURE CONTROL SYSTEM

BACKGROUND OF THE INVENTION

I. Field of the Invention

The present invention is directed generally to controlling auxiliary pusher or trailer load support axles for utility or load hauling vehicles such as dump trucks, over-the-road tractors and trailers, transit concrete mixing trucks or refuse collecting vehicles. The auxiliary pusher or trailer axle systems are used to selectively deploy auxiliary wheels in a ground-engaging, load-supporting position or to retract them to an elevated or stowed position. The systems are normally operated by forces generated by hydraulic cylinders or pneumatic springs and the amount of load support may be varied by varying cylinder pressure. The present invention more particularly relates to the automatic control of the relative amount of shared support, in keeping with the vehicle loading weight so that the axle loading of the vehicle is compensated accordingly to optimize load distribution.

II. Related Art

Transit concrete mixers are typical among those commercial vehicles that are called upon to haul a variety of load weights at different times. Such vehicles further typically include a single set of forward steering wheels and a plurality of rear, load-supporting drive axles carrying dual wheel arrangements, all mounted on an elongated continuous chassis. The chassis length or distance between certain sets of dual wheel arrangements may further be adjustable in some models. For additional support, particularly in transit when loading exceeds a minimum amount, vehicles of the class typically are provided with one or more pivotally mounted, hydraulically or pneumatically operated, auxiliary axles able to operate between a raised or stowed position carried by the truck and in a load-bearing or deployed position wherein the auxiliary axle and its wheels share the load of the truck with the permanent steering and drive wheel system. Auxiliary axles mounted forward of the drive wheels of a vehicle are typically referred to as pusher axles and those mounted aft of the drive wheels are known as trailer or tag axles. Each auxiliary axle system includes two or more wheels and possibly a plurality of dual wheel axles in such systems, the wheels may be connected by one or more through or common shafts or be independently mounted on stub axles.

Not only does an auxiliary pusher or trailer axle system assist in balancing the load carried by the truck adding safety and convenience, it also enables the truck to carry a higher total payload than would otherwise be permitted by adding one or more additional load bearing axles to which a portion of the load may be distributed to meet legal load per-axle limitations. Because the load often varies, with time however, it is often desirable to adjust the pressure in the system deploying the auxiliary axle so that the axle loading and thus the distribution of weight to the various axles of the truck is maintained at an optimum to compensate for the total loading of the vehicle.

Examples of prior auxiliary axle systems utilized with transit concrete mixing vehicles include U.S. Pat. No. 4,195,856 to Larson et al, U.S. Pat. No. 4,705,133 to Christenson et al; U.S. Pat. No. 5,498,021 to Christenson and U.S. Pat. No. 5,549,322 to Hauri. Additional tag axle systems as applied to load hauling vehicles of the refuse collecting class can be found in U.S. Pat. No. 5,090,495 to Christenson; U.S. Pat. No. 5,597,174 to Christenson et al; and U.S. Pat. No. 5,713,42,4, also to Christenson.

While these and similar embodiments have been relatively successful over the years, prior pusher and tag or trailer axles have either had no provision for adjusting the pressure applied to the deployed axle or have had only manually operable systems for adjusting the pressure applied to the axle to adjust road force in response to estimated truck payload weights. Charts for adjusting such systems manually based on estimated data may be provided for drivers to follow. One such chart is shown in Table I below. The ability to adjust the hydraulic or pneumatic pressure utilized to lower and apply force to pusher and trailer axles over a rather wide bed range not only allows a transit mixer, for example, to carry a larger legal load of concrete while complying with the required state highway weight laws, but it also allows the system to properly balance a variety of different sized loads. For example, if a driver hauls a ten-yard load of concrete (generally given as 40,000 pounds) on one load and only five yards (20,000 pounds) on another load, clearly the downward force or load carried by an auxiliary pusher or trailer axle should be readjusted downward (lowered) to maintain proper shared load balance coordination among the axles. Likewise, when the driver gets to the jobsite and the load is discharged, the pressure to the trailer axle should be reduced to a minimum or the axle prestowed by manual adjustment.

Manual systems, however, have drawbacks. In certain cases, if the driver fails to readjust the pressure for individual loads, the mixer truck may not comply with state axle weight limitations and, moreover, if the pressure is not properly reduced, the lift exerted by the pusher or trailer axle may reduce traction in the rear drive wheels of the truck. In addition, the estimated payload weights may not be as close to the actual values as desired.

Of course, the same type of load variation and estimation problems arise with respect to the collection of refuse, with large dump trucks, log-hauling vehicles or in other load hauling situations in which the weight of the payload can vary over a fairly wide range with respect to the use of the vehicle. In view of the present state of the art, there remains a need for an auto-responsive control system to modulate the application of force by auxiliary axle systems by automatically adjusting applied

TABLE I

| Yardage | Tag Pressure | Tag Axle | Pusher Axle | Tag Weight | Pusher Weight | Front Axle | Tandem Axle | GVW |
|---|---|---|---|---|---|---|---|---|
| 4.00 | 1,200.00 | Tag Down | Pusher Up | 5,989.39 | 0.00 | 15,513.13 | 25,188.08 | 46,690.60 |
| 5.00 | 1,200.00 | Tag Down | Pusher Up | 5,989.39 | 0.00 | 15,822.23 | 28,878.99 | 50,690.60 |
| 6.00 | 1,400.00 | Tag Down | Pusher Up | 6,705.95 | 0.00 | 16,544.91 | 31,439.74 | 54,690.60 |
| 7.00 | 1,800.00 | Tag Down | Pusher Up | 8,139.08 | 0.00 | 17,681.19 | 32,870.33 | 58,690.60 |
| 8.00 | 2,400.00 | Tag Down | Pusher Up | 10,288.77 | 0.00 | 19,231.05 | 33,170.78 | 62,690.60 |
| 9.00 | 2,500.00 | Tag Down | Pusher Down | 10,647.06 | 5,000.00 | 17,947.34 | 33,096.20 | 66,690.60 |

TABLE I-continued

| Yardage | Tag Pressure | Tag Axle | Pusher Axle | Tag Weight | Pusher Weight | Front Axle | Tandem Axle | GVW |
|---|---|---|---|---|---|---|---|---|
| 10.00 | 3,100.00 | Tag Down | Pusher Down | 12,796.75 | 5,000.00 | 19,304.82 | 33,589.03 | 70,690.60 |
| 11.00 | 3,100.00 | Tag Down | Pusher Down | 12,796.75 | 5,000.00 | 19,036.76 | 37,857.09 | 74,690.60 | hydraulic or pneumatic pressure applied to the system. This would improve both the versatility and the safety of the vehicles.

Accordingly, it is a primary object of the present invention to provide an automated control system for auxiliary axles that is responsive to changes in vehicle payload weight.

It is a further object of the present invention to provide an automated system for controlling the deployment pressure to auxiliary axles including each pusher or trailer axle of a vehicle based on the then-present measured payload weight.

It is a still further object of the present invention to provide an automated deployment control system for auxiliary axles which further indicates present auxiliary axle state and whether the axle should be deployed or stowed.

Yet another object of the present invention is to provide an automated auxiliary axle deployment pressure control system that utilizes real-time payload weight distribution.

Another object of the present invention is to provide an automated auxiliary axle control system that coordinates real-time, payload weight distribution with data from a permanent stored record of unloaded vehicle parameters to provide desired real-time axle/weight distribution.

Other objects or advantages will become apparent to those skilled in the art upon familiarization with the specification, claims and drawings contained herein.

SUMMARY OF THE INVENTION

The present invention provides a method and apparatus for automated auxiliary pusher (forward) or trailer (rearward deployed) axle pressure control. The invention supplies the ability to automatically adjust road support force applied by pusher or trailer wheels in each set of such wheels and is very useful in a vehicle subject to time-variable loading. The invention applies equally to hydraulically or pneumatically operated pusher and/or trailer wheels and the wheels of each axle or set can be controlled in accordance with the invention. The system can also be using auxiliary support wheels mounted and configured to operate separately on stub axles or in unison on single or multiple through axles. The control system is particularly suitable for use with a class of vehicles including any heavy-duty hauling truck or trailer accustomed to payload variations, examples including transit concrete mixers, dump trucks, log haulers and refuse collecting vehicles. Generally, not only does the total load change but the distribution of the load among vehicle axles may also vary greatly.

The control system of the invention includes one or more integral devices or frame scales which enable accurate weight measurement of amount and distribution the carried payload such as the weight of a load of concrete in a mixing drum. The measurements may be sensed continually, i.e., metered on a real-time basis and may include measurements of the weight carried by each axle or axle group. These measurements then, in turn, are used in the control of the hydraulic or pneumatic pressure applied to one or more deployed sets of pusher and/or trailer wheels, and/or other aspects of a vehicle suspension system thereby compensating for light loads, intermediate and maximum loads and load distribution. In the case of concrete, for example, the direct accurate weight measurement, of course, has the added value over volume based measurements in that it further compensates for the difference in the weight per yard (density) of various mixes not taken into consideration by previous manual systems that predicted adjustment based on yardage (volume) alone.

Because every axle or axle set can be metered and the system can have the ability to modulate pressure to individual auxiliary wheel sets and possibly individual auxiliary wheels on either side of the vehicle as well, this allows the invention to function as an auto leveling system or to compliment such a system by adjusting relative load distribution among support axles and possibly individual wheels.

Of course, the system of the invention also recognizes the lightly loaded or unloaded truck or trailer condition which can be utilized to reduce the pressure to a minimum or prompt the driver to stow the pusher or trailer wheels completely. Thus, when the drum of a mixing vehicle or load compartment of another vehicle is empty, the pressure is reduced to a minimum setting, i.e., 900–1000 psi typically for a hydraulic system and 0–120 psi for a pneumatic spring bellows system or the axle raised and stowed. Conversely, the system may prompt the driver to lower raised auxiliary or trailer axles when the load weight reaches a certain given minimum amount, depending on the vehicle involved. The control system itself can also be configured to automatically raise and lower the pusher or trailer axles if desired.

Any conventional vehicle-mounted weighing system, including strain gauges, leverage devices and beam type scales or load cells, etc., can be used and, in one embodiment, the system includes a chassis/axle balanced beam differential system which measures chassis/axle gap variations at several points and yields an electrical output signal which can be utilized as an input to a control system used to control a pneumatic or hydraulic pressure modulating valve automatically. Onboard frame scale systems including embodiments that may be leaf-spring mounted, air spring or axle mounted are available, for example, from Weigh-Right of Hutchinson, Kansas and other manufacturers of such systems. If deployment/storage is not automatic, audio and/or visual signals may be utilized to alert the driver of the vehicle, as necessary, to deploy or stow trailer and/or pusher axles as needed.

The control system itself contains an amount of pre-programmed computer data relating to final sizes and weight parameters of the unloaded vehicle typically stored on a computer card located in an enclosure and which is integral to the hydraulic system. The card is programmed for the particular vehicle as manufactured and contains all the necessary fixed parameters and data to utilize real-time weight signals to accomplish the correct control utilizing pressure modulation.

Of course, the system is also configured so that if it experiences a malfunction, the auxiliary wheels may be deployed and adjusted using standard manual operating system as a back up or another alternate system can also be used.

BRIEF DESCRIPTION OF THE DRAWINGS

In the drawings where like numerals like parts throughout the same.

DETAILED DESCRIPTION

The present invention contemplates improved axle loading control with respect to vehicles equipped with auxiliary pusher or trailer load support axles, particularly for utility or load-hauling vehicles, including dump trucks, transit concrete mixing trucks refuse collecting vehicles or the like. The additional control contemplates not only indicating to the driver whether or not the trailer or pusher wheels should be deployed and warning of improper condition but also contemplates total load and load balance control in a manner which can be used to maximize allowable load and optimize load distribution. Although the detailed embodiment described below, describes a stretch-type concrete transit mixing vehicle this is meant by way of example only with no limitation intended with respect to the scope of the invention.

Figure 1:
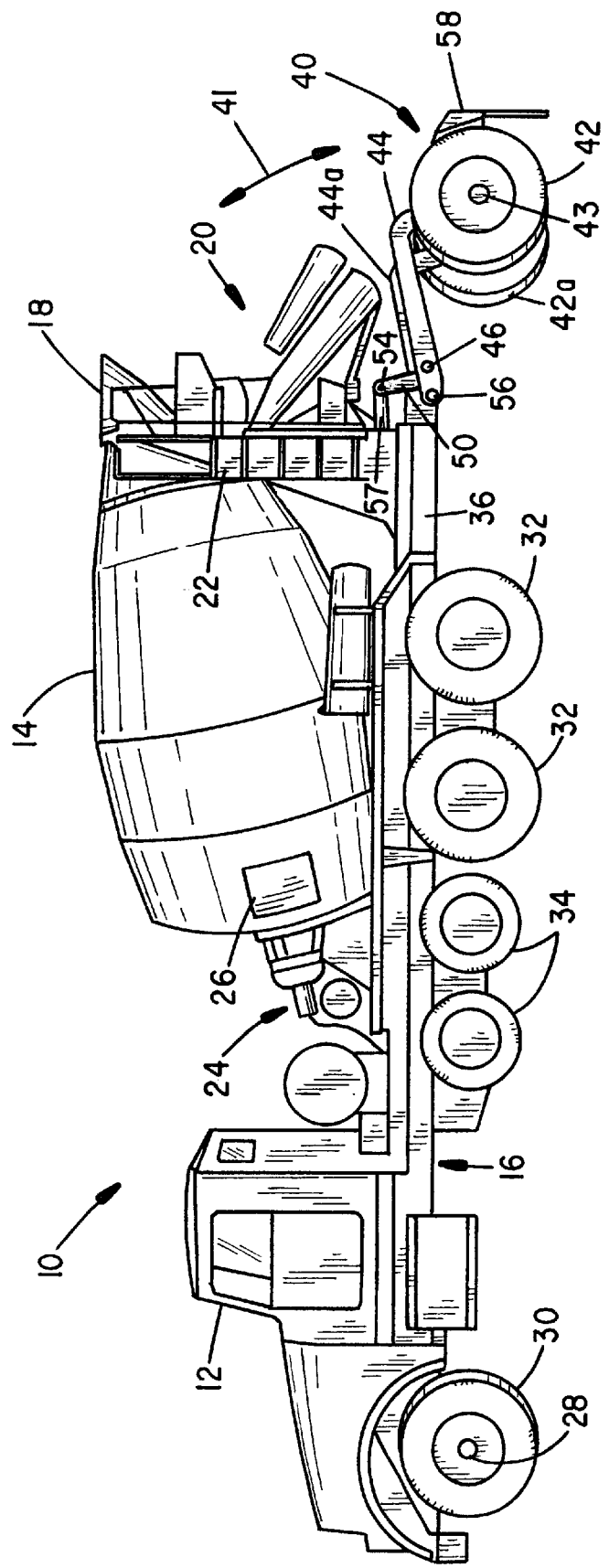
FIG. 1 shows a side view of a transit concrete mixer of the stretch variety suitable for use with the axle pressure control system of the present invention illustrating a retracted pusher auxiliary axle system and a trailer auxiliary axle systems depicted in the deployed or ground-engaging position.
Figure 2:
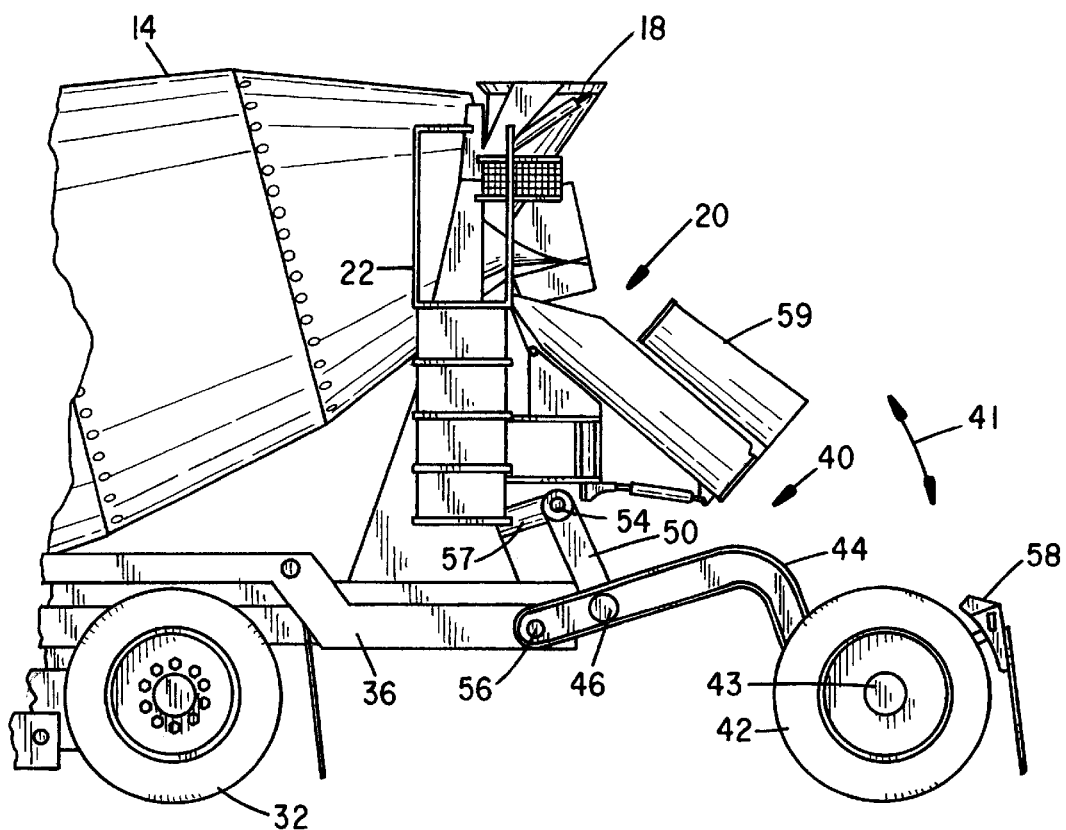
FIG. 2 is a fragmentary view of the rear portion of a truck similar to that shown in FIG. 1.

FIGS. 1 and 2 depict a transit concrete mixing truck of the stretch variety, generally at 10 that includes a forward cab 12 and a rotatable mixing drum of 14 mounted on a truck chassis 16 and spaced behind the cab. The mixing drum is provided with a loading hopper 18 that facilitates the loading of cement, water, fly ash, chemicals and aggregate into the drum through an access opening in the upper rear of the drum 14. Mixed concrete is also discharged through the rearward opening by reversing the rotation of the drum thereby reversing the movement of the concrete caused by the flights of the mixing fins, the concrete placement being guided by a compound cylinder-operated chute system at 20, an access ladder 22 is provided to assist the operator in inspecting and cleaning the drum. The drum rotating mechanism is shown generally by 24 and an inspection hatch cover is depicted at 26.

Figure 3:
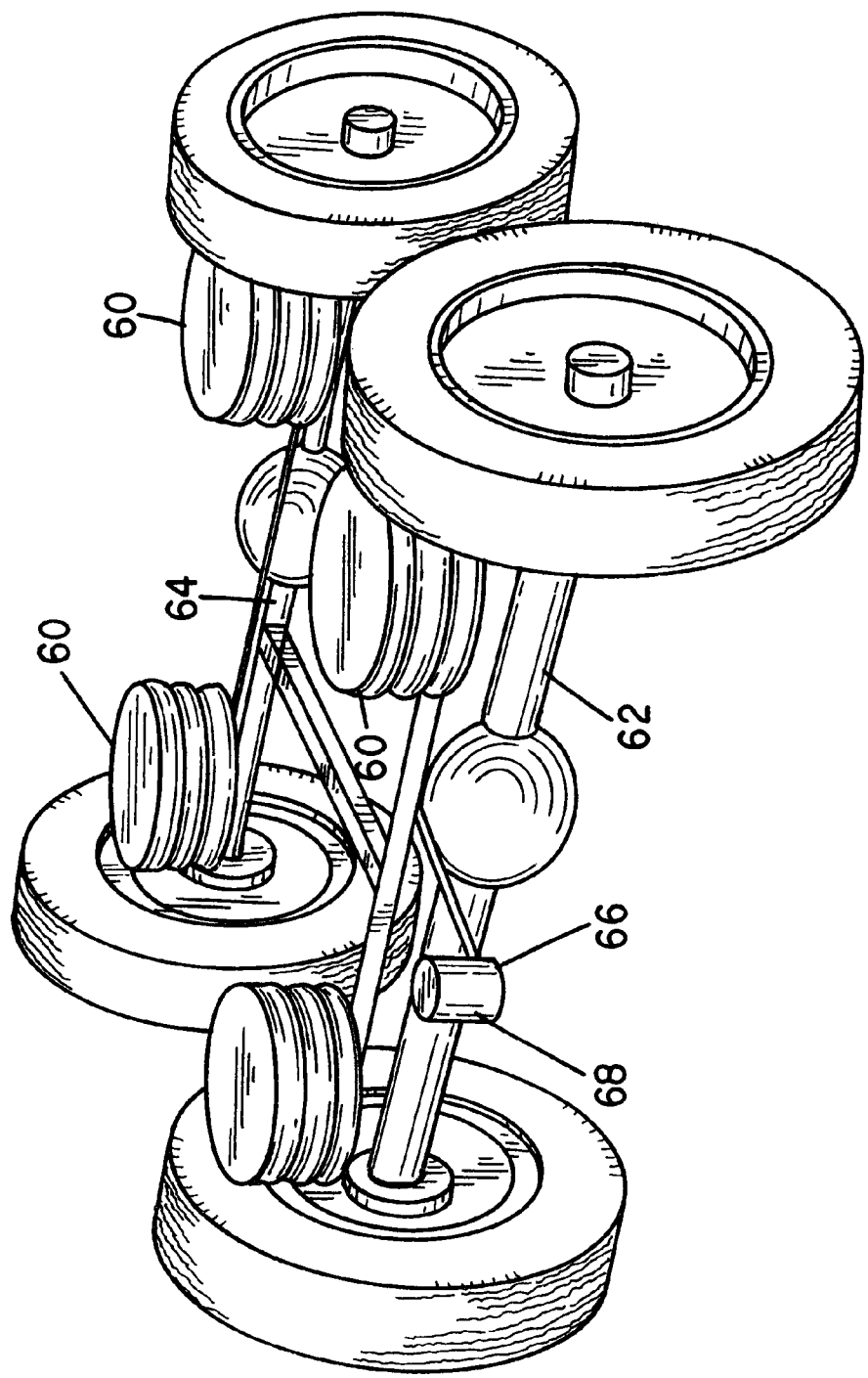
FIG. 3 is a fragmentary schematic view of an onboard front axle scale system.

As indicated, the cab 12 and the mixing drum 14 are supported by the chassis 16 which is, in turn, carried by a plurality of axle mounted wheels including a front or forward steering axle 28 having a pair of wheels one of which is shown at 30 and a set of dual drive axles carrying sets of dual wheels 32 a forward dual tandem pusher axle set which may be similar to those shown in FIGS. 2 and 3 includes tires two of which are shown at 34. In FIG. 1 the pusher system is shown in the raised or stowed position. The truck chassis or frame further includes a pair of spaced heavy longitudinal structural members, normally channel shapes such as those depicted at 36 in FIG. 1 and FIG. 5.

The trailer axle system of the invention is depicted generally by the reference numeral 40 and pivots generally vertically as depicted by the arrow 41. The trailer axle system 40 also includes space tag wheels 42 and 42a generally mounted on a stub axles, one of which is shown at 43. The frame of the trailer axle system 40 also includes a pair of spaced trailer axle arms 44 and 44a, each connected at one end to an outer frame member (not shown) and near the other end by an inner transverse frame member 46, normally a heavy tubular member. A trailer axle cylinder mounting lever shown at 50 is fixed to the member 46 with a trailer axle cylinder pivot mount shown at 54 and the entire trailer axle is pivoted about a pair of joints, which attach the trailer wheel assembly to the members 36, one of which is shown at 56, by a double-acting fluid cylinder shown partially at 57. The deployment cylinder/cylinders operate the lever 50 through pivot joint 54. Extending the cylinder 57 deploys the trailer axle with a downward force commensurate with applied fluid pressure and retracting the cylinder raises and stows the trailer assembly. A trailer axle fender is depicted at 58 and a moveable discharge chute at 59.

The construction and operation of both the dual pusher axle system and trailer axle system 40 are well known to those skilled in the art and, it is believed, need no further detailed description here. The degree of support offered, of course, is related to the pressure in the hydraulic or the pneumatic system which is utilized for the deployment for such auxiliary axles. If more details are required, such are available, for example, in U.S. Pat. Nos. 4,684,142, 5,090, 495 and 4,416,135 (pneumatic or dual systems) and U.S. Pat. Nos. 5,498,021, 4,684,142, 4,195,856, 5,597,174 and other patents for hydraulic and dual operable examples. These references are deemed incorporated by reference herein for any purpose.

Figure 4:
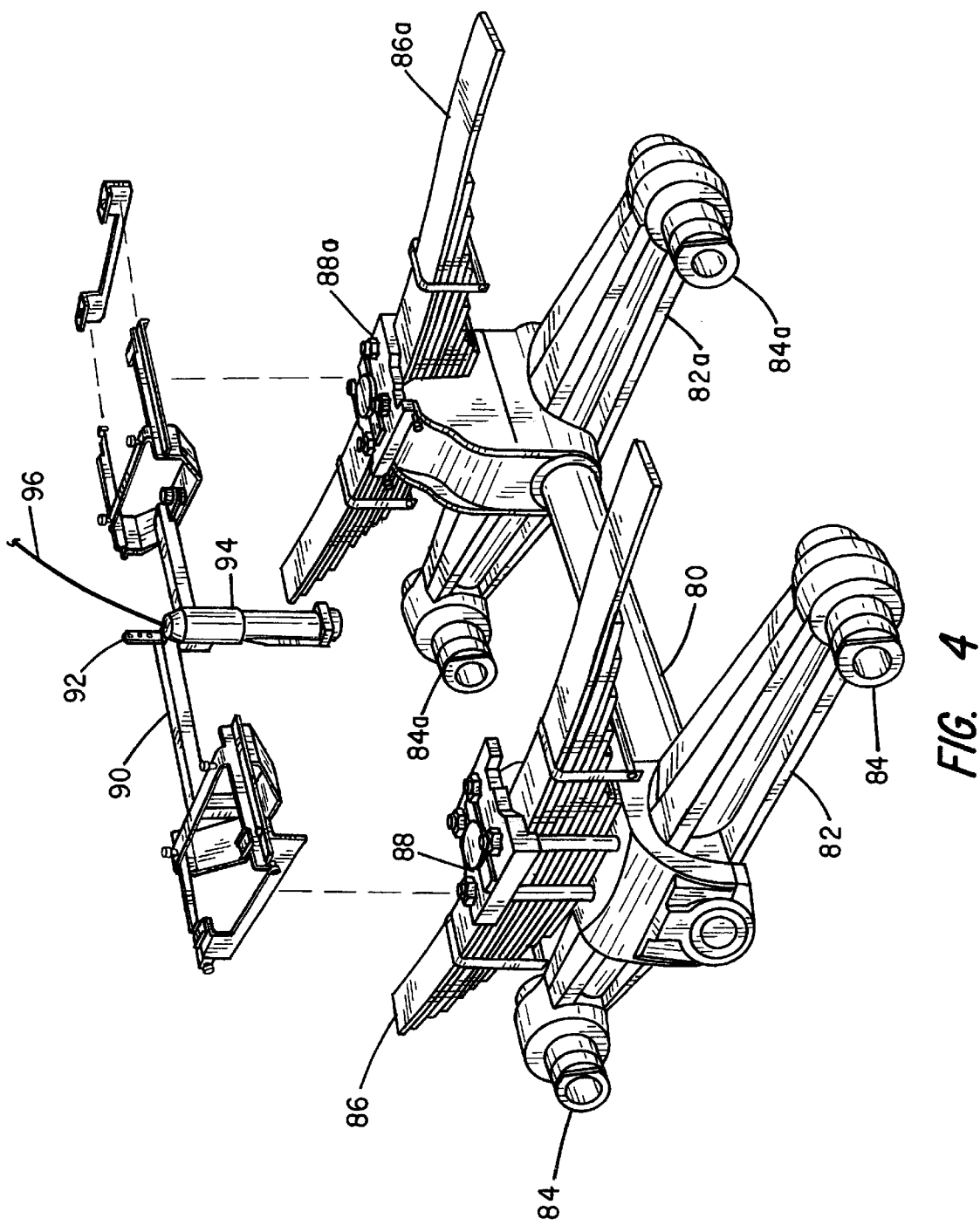
FIG. 4 is a fragmentary schematic view illustrating a possible configuration of a spring mounted onboard scale system for dual axles.
Figure 5:
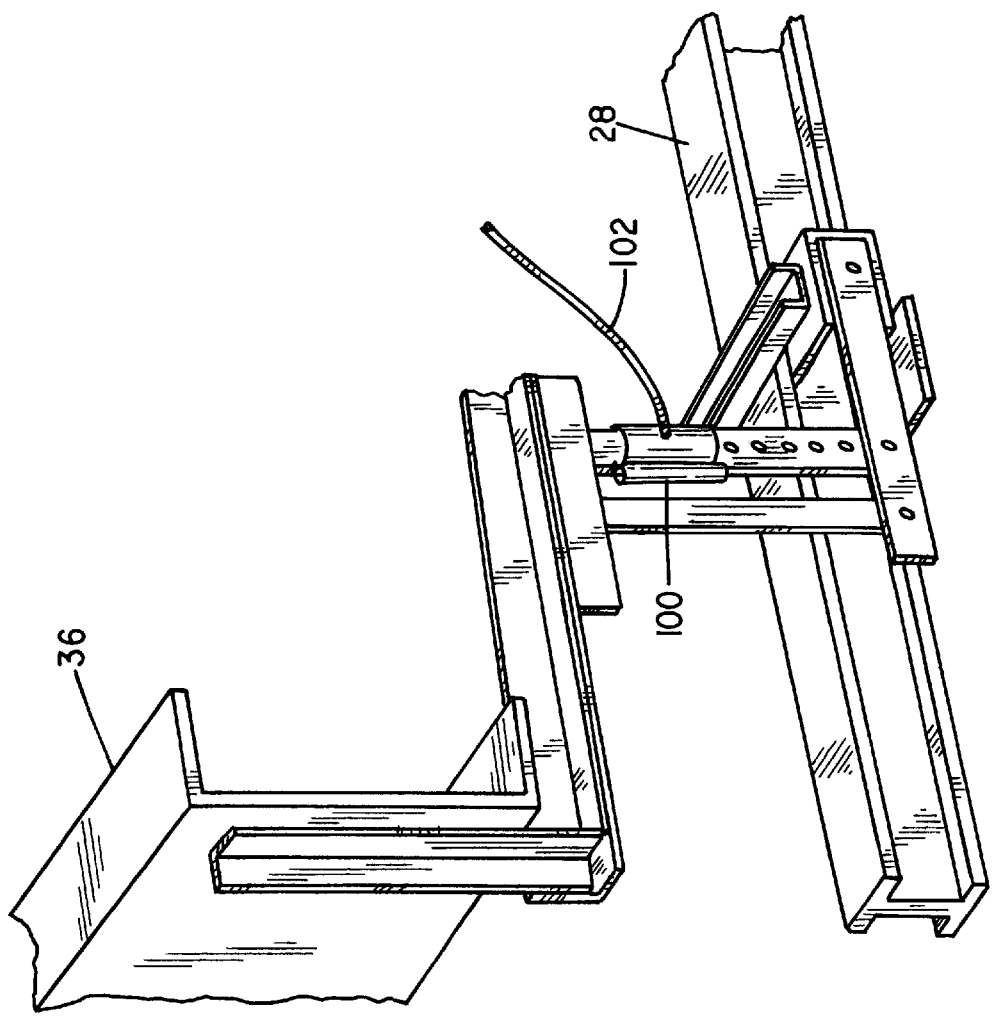
FIG. 5 shows a further fragmentary schematic view of an air scale system usable in accordance with the invention.
Figure 6:
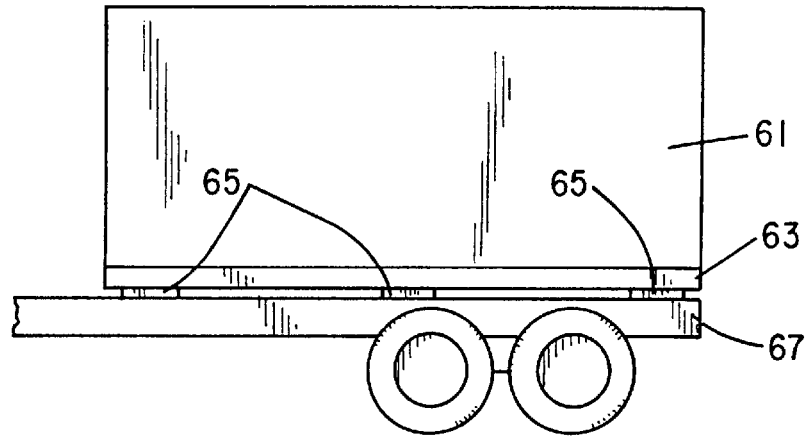
FIG. 6 is a schematic drawing showing common locations of frame scales.

FIGS. 3–6 illustrate the various onboard weighing or frame scale systems usable with the control system of the present invention. FIG. 6 depicts a general schematic view of typical frame scale locations. A truck body 61 with body frame 63 is supported by a plurality of frame scales some of which are shown at 65 between the body frame 63 and the truck frame or chassis 67.

FIG. 3 pneumatically depicts an air scale system which employs a plurality of air bags 60, one associated with each wheel of a four-wheel set mounted on a two through axles 62 and 64. This system further includes a leveling valve 66 and a pressure measuring air sensor 68, which taps into the air line between the air bag 60 and the leveling valve 66 to monitor the pressure in the system. This produces an output 70 carried by a conductor cable indicative of the weight on the entire suspension group and which can be used for monitoring and control of group deployment pressure.

FIG. 4 depicts a fragmentary schematic view showing of a spring scale system and a leaf-spring mounted version. This system is mounted on a single through axle 80 and carries a pair of heavy walking beams 82 and 82a each designed to carry a pair of dual-wheel stub axles 84 and 84a. A pair of leaf springs 86 and 86a are provided which carry on respective mounting pads 88 and 88a, a rugged but sensitive balance beam type scale system, including an averaging beam 90 with axle bed mount 92 and transducer carrier 94 which produces an output carried on a three wire cable as at 96.

A front axle scale system is shown at FIG. 5 mounted between a frame rail 36 and front axle 28. That system includes a pressure transducer carrier 100 connected to an output utilization system by a multiple wire 12-volt cable system 102.

It should be noted that the outputs from the onboard scale system illustrated at 70, 96, and 102 can also be connected to alarms, analog or digital meters and even printers. Signals may be conditioned and processed in any well known manner to be utilized in the control of the associated auxiliary axles of the vehicle and the readings from all axles of the vehicle. Systems of this class can be readily retro-fit on present vehicles or installed on newly manufactured models. As illustrated in the figures it can be seen that the onboard weighing systems illustrated can either be used with pneumatic or hydraulic control systems and can be used to meter the weight distributed on either deployable or fixed axle systems.

Figure 7:
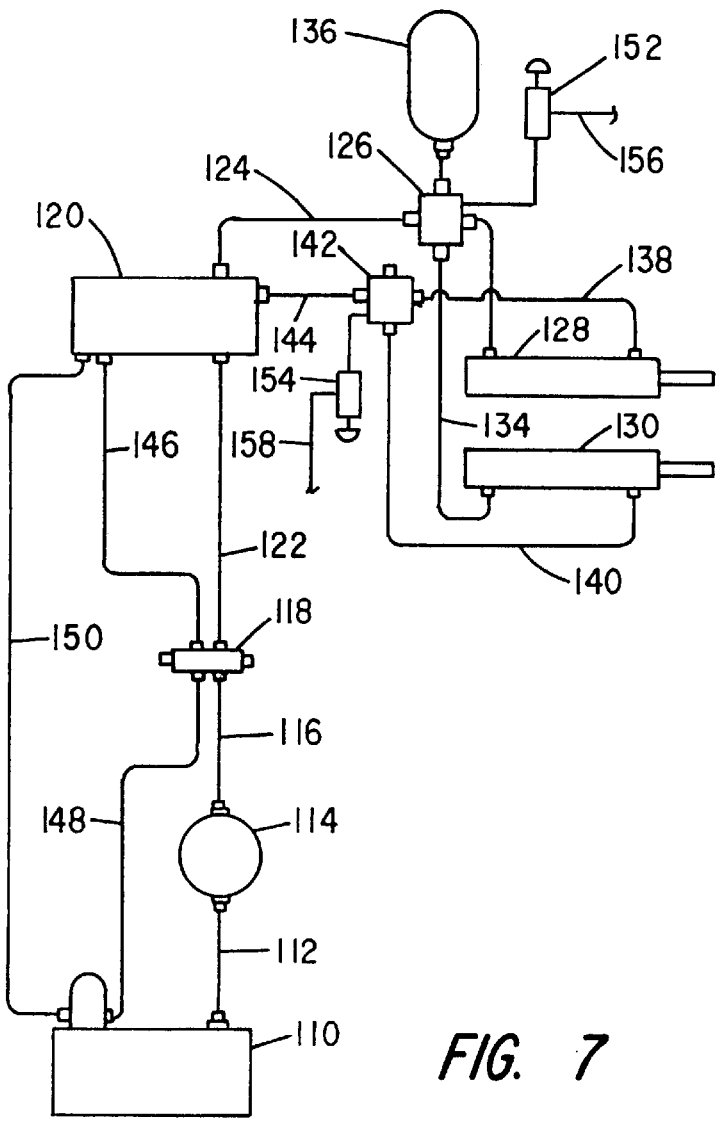
FIG. 7 is a simplified hydraulic schematic drawing illustrating an embodiment of the invention.

FIG. 7 depicts a simplified schematic of a possible hydraulic system utilized to control the deployment pressure to a pusher or tag axle system in accordance with the invention. This system includes a fluid reservoir 110 which is connected by a hydraulic line 112 with pump 114. The high pressure pump output line 116 is connected to a cylinder control valve 118 which, in turn, is connected to a valve module 120 via line 122. A further high pressure line 124 connects valve module 120 with manifold 126 which, in turn, is connected to the blind end of cylinders of 128 and 130 via lines 132 and 134 and to an accumulator 136. A pair of rod end lines are shown at 138 and 140, respectively, connecting the rod end ports of cylinders 128 and 130 with a second manifold 142 which, in turn, is connected to the valve module 120 via line 144. The reservoir return line 146 connects back through control valve 118 and drain line 148 to the reservoir 110. A bypass return line is provided at 150.

Figure 9:
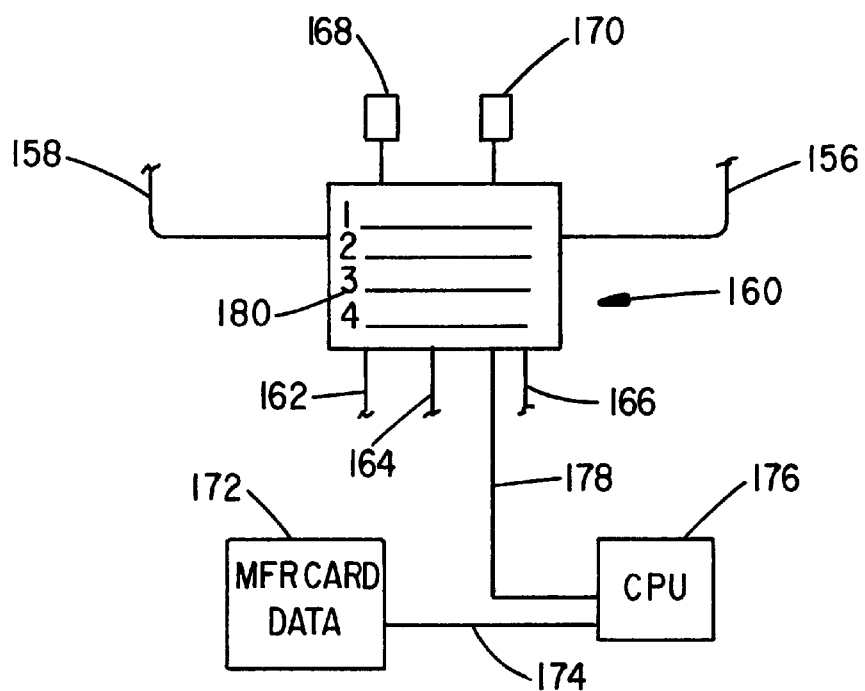
FIG. 9 is a schematic drawing of a pressure control system in accordance with the invention.

A variable pressure controller device 152 is shown connected to manifold 126 and a similar device 154 is shown connected to the manifold 142. These are pressure control devices that are connected to receive respective control signals on line 156 and 158 emanating from control module 160 shown in FIG. 9 to control the operation of cylinder 128 and 130. In FIG. 9, the control module is generally shown connected to various weight scale inputs that may be represented by 162, 164, and 166 and include an audio alarm or other output 168 and possibly a visual output or warning device 170. The output signals 156 and 158 may be used to modulate the hydraulic pressure to the blind end and rod end of the cylinders 128 and 130 as required to control pusher or tag axle deployment and are to deploy or retract the pusher or tag wheels automatically or to indicate to the driver or operator that this should be done.

Manufacturer's specifications and other relevant redetermined data related to the vehicle involved that may be contained on a data card is shown at 172 connected via 174 with a CPU 176 shown connected to Module 160 via cable 178. CPU 176 is normally an integral part of control module 160.

Figure 8:
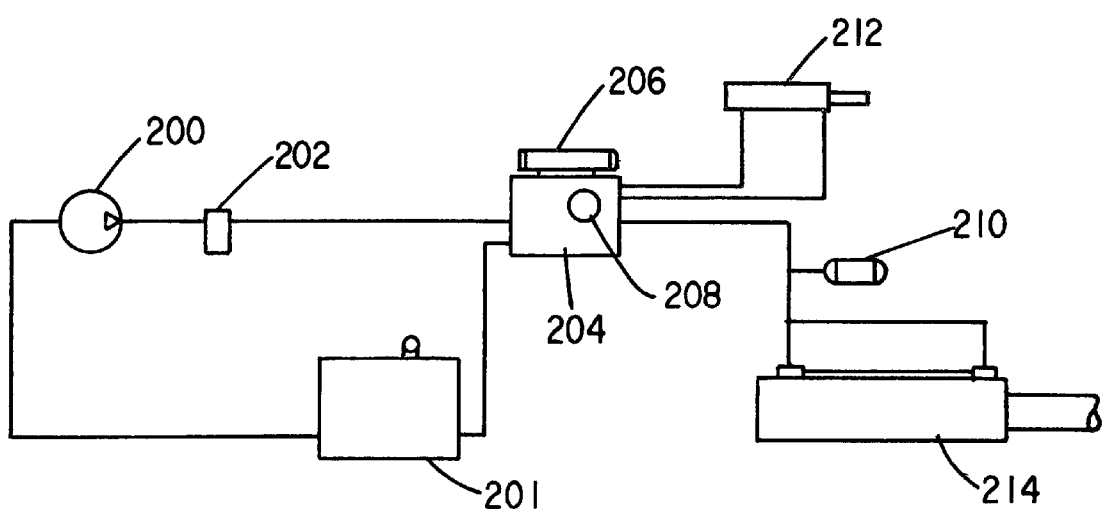
FIG. 8 is a simplified hydraulic schematic drawing illustrating and trailer cylinder control system.

Another typical hydraulic system for manually or automatically raising and lowering the trailer wheel system of a transit mixer or the like is schematically represented in FIG. 8. That system includes a pump 200 with associated reservoir 201, filter 202, associated central control manifold 204 with directional valve 206 and pressure reducing valve 208. An accumulator is as shown at 210 and a chute lift cylinder at 212. A trailer axle deployment cylinder is depicted at 214. In this embodiment the pressure reducing valve 208 is adjusted to regulate the pressure in the trailer cylinder 214

Shown at 172, in FIG. 9, readouts of weight distribution on all axles or axle systems can also be available at a on-going basis using the received data and, responsive to such data, the hydraulic system of FIGS. 5 or 8 can be utilized to automatically modulate the pressure and the cylinders to thereby modulate the force exerted by tag or pusher axle system required to achieve the optimum load balancing and maintain a legal axle load deployment for the entire vehicle. This can be achieved by modulating the system on an on-going basis.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A load hauling vehicle including an automated auxiliary axle deployment control system for varying auxiliary axle support comprising:
   (a) a load hauling vehicle including a plurality of deployable fluid-operated auxiliary support axles;
   (b) a plurality of load sensing devices placed at different locations and with respect to a plurality of axles on the vehicle for determining the total payload of the vehicle and distribution thereof, including the side-to-side payload distribution, in real-time, each load sensing device producing output signals indicative of the load supported at a location;
   (c) a plurality of automatically operable pressure modulation valves, one for adjusting the force applied to a corresponding one of said auxiliary support axles to deploy and adjust the load carried thereby;
   (d) signal processing system for receiving input signals from said load sensing devices and producing output control signals for operating said plurality of pressure modulation valves.

2. The apparatus of claim 1 further comprising devices to cause each auxiliary axle to deploy and retract automatically based on said output control signals.

3. The apparatus of claim 2 wherein the control system is computer controlled.

4. The apparatus of claim 2 wherein the plurality of pressure modulation valves include pressure modulator devices to modulate the pressure applied to individual wheels of an auxiliary axle.

5. The apparatus of claim 1 wherein the plurality of pressure modulation valves include pressure modulator devices to modulate the pressure applied to individual wheels of an auxiliary axle.

6. The apparatus of claim 5 wherein said pressure modulation devices operate automatically to control the pressure at each auxiliary wheel based on said output control signals.

7. The apparatus of claim 1 wherein the control system is computer controlled.

8. The apparatus of claim 1 further comprising a device to prompt the driver to stow or lower each auxiliary support axle.

9. The apparatus of claim 1 wherein said load sensing devices include a plurality of frame scales.

10. The apparatus of claim 9 wherein said load sensing devices include a balanced beam differential system.

11. The apparatus of claim 10 further comprising devices to cause each auxiliary axle to deploy and retract automatically based on said output control signals.

12. The apparatus of claim 9 further comprising devices to cause each auxiliary axle to deploy and retract automatically based on said output control signals.

13. The apparatus of claim 1 wherein said load sensing devices include a balanced beam differential system.

14. The apparatus of claim 1 wherein the auxiliary axles include a tag axle and a pusher axle.

15. The apparatus of claim 1 wherein said fluid is hydraulic fluid.

16. The apparatus of claim 1 wherein said load-hauling vehicle is a transit concrete mixing truck.

17. An automated auxiliary axle system for a load-hauling vehicle selected from transit mixing and refuse collecting vehicles having a time-variable payload comprising:

(a) a plurality of fluid-operated auxiliary support axles including a tag axle and a pusher axle;

(b) a plurality of load sensing devices including a plurality of frame scales placed at different locations on the vehicle to monitor the total payload of the vehicle and the distribution thereof in real-time, including the side-to-side payload distribution, each load sensing device producing output signals indicative of the load supported at a location;

(c) a plurality of automatically operable pressure modulation valves, one for adjusting the force applied to deploy a respective one of said auxiliary support axles and to adjust the load carried thereby;

(d) signal processing system for receiving input signals from said load sensing devices and producing output control signals for operating said plurality of pressure modulation valves; and (e) an output device located in the truck cab to prompt an operator to stow or lower each auxiliary axle.

18. The apparatus of claim 17 further comprising devices to cause each auxiliary axle to deploy and retract automatically based on said output control signals.

* * * * *